United States Patent [19]
Dowell

[11] 3,738,457
[45] June 12, 1973

[54] FRICTION MECHANISMS

[75] Inventor: Frederick Sidney Dowell, Coventry, England

[73] Assignee: The Dunlop Company Limited, Erdington, Birmingham, England

[22] Filed: Jan. 8, 1971

[21] Appl. No.: 104,987

[30] Foreign Application Priority Data
Jan. 14, 1970 Great Britain .................... 1,759/70

[52] U.S. Cl......... 188/218 XL, 188/73.2, 192/107 R
[51] Int. Cl............................................. F16d 65/10
[58] Field of Search.......... 188/73.2, 73.1, 218 XL; 192/107 R

[56] References Cited
UNITED STATES PATENTS

| 3,426,871 | 2/1969 | Harnish ........................ 188/218 XL |
| 3,599,766 | 8/1971 | Ely et al. ...................... 188/218 XL |
| 3,422,936 | 1/1969 | Marcheron ................... 188/218 XL |
| 3,613,851 | 10/1971 | Ely et al. ......................... 192/107 R |
| 3,371,749 | 3/1968 | Lucien et al. ............. 188/218 XL X |

*Primary Examiner*—Richard E. Aegerter
*Assistant Examiner*—Bruce H. Stoner, Jr.
*Attorney*—John A. Young

[57] ABSTRACT

An annular friction member for use in a disc brake or like friction mechanism comprising a plurality of interconnected friction elements, each friction element being interconnected with the two circumferentially adjacent elements, operatively associated with a rotatable or non-rotatable portion of the disc brake or like friction mechanism and also secured to a retaining ring arranged to extend adjacent one of the peripheries of the elements, of which the following is a specification.

4 Claims, 21 Drawing Figures

PATENTED JUN 12 1973

FRICTION MECHANISMS

This invention relates to disc brakes and like friction mechanisms in which substantially segmental-shaped friction elements are arranged to be interconnected to form an annular friction member.

It is already well known in the art to provide annular segmental-shaped friction members for use as rotors and stators in disc brakes but considerable difficulty has been experienced in providing a simple and efficient means of interconnecting the friction elements which is relatively unaffected by thermal distortion and shrinkage.

One object of the present invention is to provide an improved form of friction member for disc brakes.

According to one aspect of the present invention an annular friction member for use in a disc brake or like friction mechanism comprises a plurality of interconnected substantially segmental-shaped friction elements, each element being arranged to be operatively associated with either a rotatable or non-rotatable portion of the disc brake or friction mechanism, each of the friction elements being secured to a retaining ring arranged to extend adjacent one of the peripheries of the elements, each friction element being interconnected with the two circumferentially adjacent friction elements in such a manner as to resist any tendency of the element to rotate in its plane during braking under the action of a moment set up by the resultant frictional force acting on the element and the reaction force applied to the element by the rotatable or non-rotatable portion of the disc brake or friction mechanism.

According to a second aspect of the present invention an annular friction member for use in a disc brake or like friction mechanism comprises a plurality of interconnected substantially segmental-shaped friction elements, each element being arranged to be operatively associated with either a rotatable or non-rotatable portion of the disc brake or friction mechanism, each element comprising a pair of principal load-carrying outer layers and an inner layer sandwiched therebetween, the inner layer of each element being circumferentially displaced relative to the outer layers of the element so that the outer layers of each element also overlap the inner layer of the circumferentially adjacent element, the outer layers of each of the friction elements being secured to a retaining ring arranged to extend adjacent one of the peripheries of the elements, the retaining ring being arranged to communicate the tendency of the two outer layers of each element to rotate in their own planes during braking, under the action of a moment set up by the resultant frictional force acting on the element and the reaction force applied to the element by the rotatable or non-rotatable portion of the disc brake or friction mechanism, to one of the two inner layers directly associated with the outer layers of each element, said inner layer being associated with the two overlapping pairs of outer layers so as to resist their respective tendencies to rotate under braking.

Figures 1, 3:
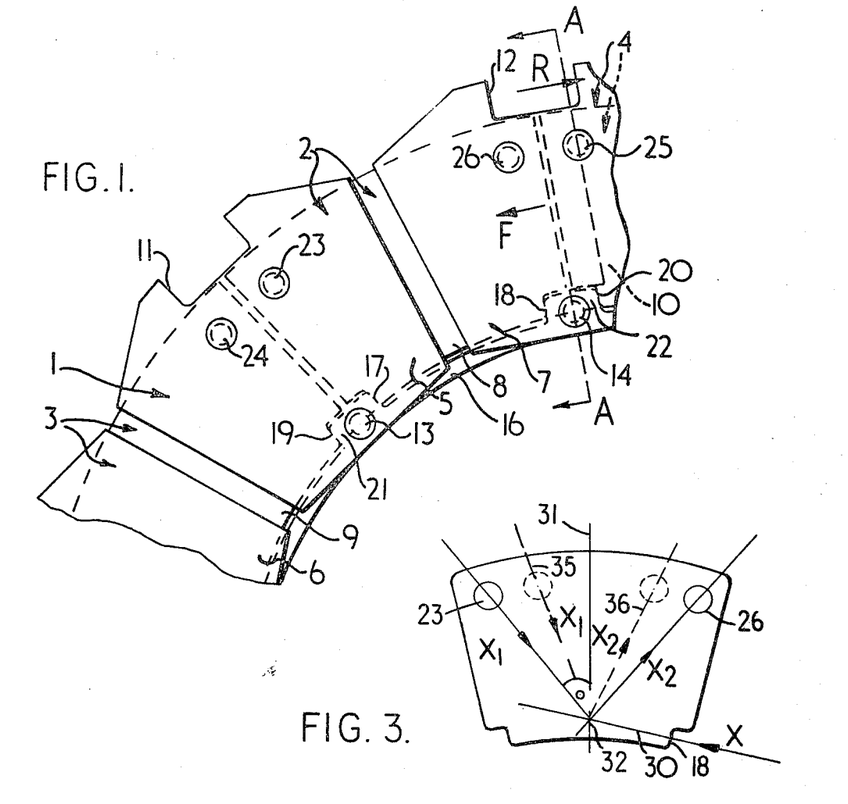
FIG. 1 is a side view of part of a friction member in accordance with the present invention.
FIG. 3 is a diagrammatic representation of the forces acting on inner layer 8 of element 2.

Several embodiments of the present invention will now be described by way of example with reference to the accompanying drawings of which:

FIG. 1 shows a side view of part of an annular friction member in accordance with the present invention for use as a rotor in a multi-plate aircraft disc brake.

Figures 2, 6, 7:
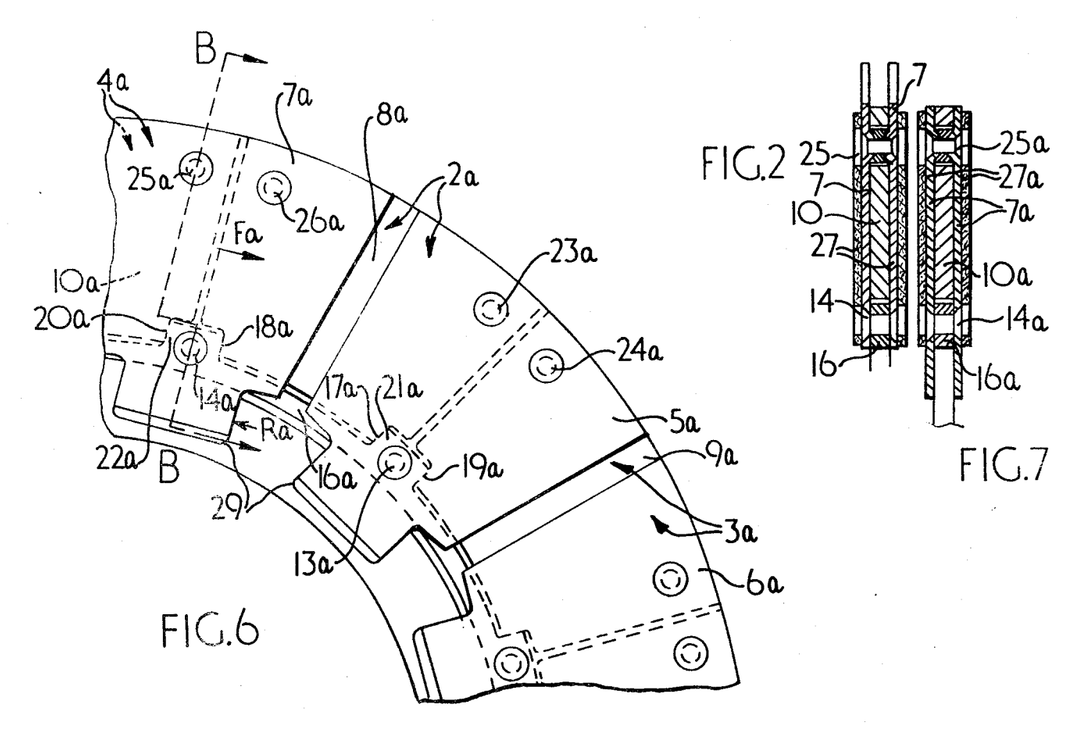
FIG. 2 is a cross-sectional view on the line A—A of FIG. 1.
FIG. 6 is a side view of part of another friction member in accordance with the present invention.
FIG. 7 is a cross-sectional view on the line B—B of Figure

The friction member 1 is made up of a plurality of substantially segmental-shaped elements, generally designated fro example 2, 3, 4, each element having a three-layer construction comprising two principal load-carrying outer layers 5, 6 and 7 and a circumferentially displaced relatively low load-carrying inner layer 8, 9 and 10 (see FIG. 2). With this type of construction the outer layers of each element overlap the inner layer of the circumferentially adjacent element. The two outer principal load-carrying layers of each element are formed from a relatively strong material such as steel, while the inner layer may be utilized principally as a heat sink and formed from a material with a higher thermal capacity such as beryllium or a carbon or boron composition. Circumferentially adjacent inner layers are spaced from each other to allow for manufacturing inaccuracies and the effect of thermal expansion under braking.

Both the outer layers of each element may carry friction pads 27, omitted from FIG. 1 for clarity, on their axially outer sides, or alternatively only one outer layer, or in some cases neither outer layer, may carry a friction pad. The outer layers are also provided with cutouts 11,12 to engage support means in the form of keys (not shown) which extend in a direction parallel to the axis of the annular friction member, the support means being associated with a rotatable portion of the associated aircraft wheel. The two outer layers of each element are rivetted 13,14, or secured in any other suitable manner, to a retaining ring 16 at a position adjacent their inner peripheries. By securing the outer layers of each element to the ring 16 in this manner the tendency of the elements to fly radially outwards under the action of centrifugal force is resisted and the elements are prevented from jamming against the support keys.

The inner layer of each element is provided with abutment surfaces 17,18: 19:20 arranged to engage corresponding surfaces on abutments 21,22 formed on the retaining ring 16.

The outer layers of each element are secured to the inner layer of each respective element and the circumferentially adjacent element at positions adjacent the outer peripheries of the inner layers by rivets 23,24: 25,26.

The natural tendency of each element to rotate in its own plane about its support means under the influence of the moment set up by the resultant frictional force F (see FIG. 1) acting on the element and the reaction force R transmitted to the element by the support means is counteracted by the rivets and abutting surfaces in the following manner.

The couple acting on the outer layers 7 of rotor element 4, resulting from the resultant frictional force F and the reaction force R, tends to rotate the element clockwise when the rotor is subjected to braking forces while spinning in a clockwise direction (see FIG. 1). This rotation is transmitted from the outer layers 7 of rotor element 4 to the retaining ring 16 by rivets 14. This causes the ring to move slightly in an anticlockwise direction and make abutting contact with surfaces 18,19, etc. on inner layers 8,9 etc. Thus the tendency of the outer plates of element 4 to rotate in a clockwise direction is communicated to the inner layer 8 of the circumferentially adjacent element 2 as a force X acting at right angles to abutment surface 18 (see FIG. 3).

The force X acting on inner layer 8 tends to rotate inner layer 8 in a clockwise direction. This tendency being resisted by forces $X_1$ and $X_2$ exerted on inner layer 8 by rivets 23 and 26 (see FIG. 3). For equilibrium, the forces acting on inner layer 8 must intersect at a point and on considering the diagrammatic representation of the forces acting on inner layer 8, shown in FIG. 3, it can be seen that for equilibrium the point of intersection of the rivet forces $X_1$, $X_2$ and communicated force X must be on the line of action 30 of X. If the position of rivets 23 and 26 is symmetrical about the axis of symmetry 31 of inner layer 8 and the rivet holes in the inner and outer layers are perfectly aligned the forces $X_1$, $X_2$ and X will intersect at the point of intersection 32 of axis of symmetry 31 and the line of action 30 of X. Thus the magnitudes of $X_1$ and $X_2$ can be obtained for a given rivet configuration and for a given value of X.

Figure 4:
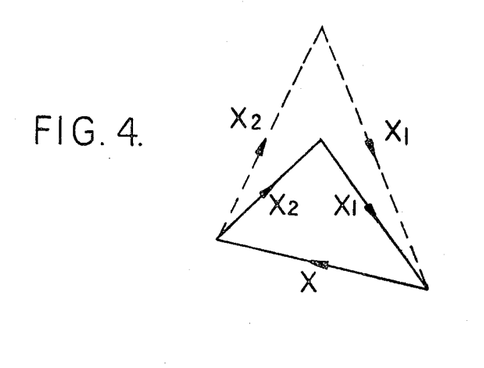
FIG. 4 is a triangle of forces (not to scale) for the force distribution shown in FIG. 3.

Due to manufacturing tolerances this theoretical condition is difficult to attain, and the point of intersection 32 is likely to be displaced to one side or the other of axis of symmetry 31. It is however desirable to maintain the point of intersection as close to the axis of symmetry as possible by accurate manufacturing procedure in order to avoid undesirable imbalances in the loading of rivets 23 and 26. FIG. 4 shows the triangle of forces for inner layer 8 and illustrates, in dotted detail 33 and 34, the manner in which the forces exerted by rivets 23 and 26 must increase in order to maintain equilibrium, for a given magnitude of X, as rivets 23 and 26 are positioned closer to the axis of symmetry 31, as shown by dotted detail 35 and 36 in FIG. 3. This clearly demonstrates the desirability of spacing rivets 23 and 26 as far apart as possible in order to allow the inner layer to be formed from a structurally weaker material. The wide spacing of rivets 23 and 26 also has the advantage of bringing the pairs of rivets 26,25: 24,23 in each outer layer of the rotor closer together which assists in minimizing the shear loading exerted on these pairs of rivets due to the heat shrinkage of the outer layers.

Figures 5, 8:
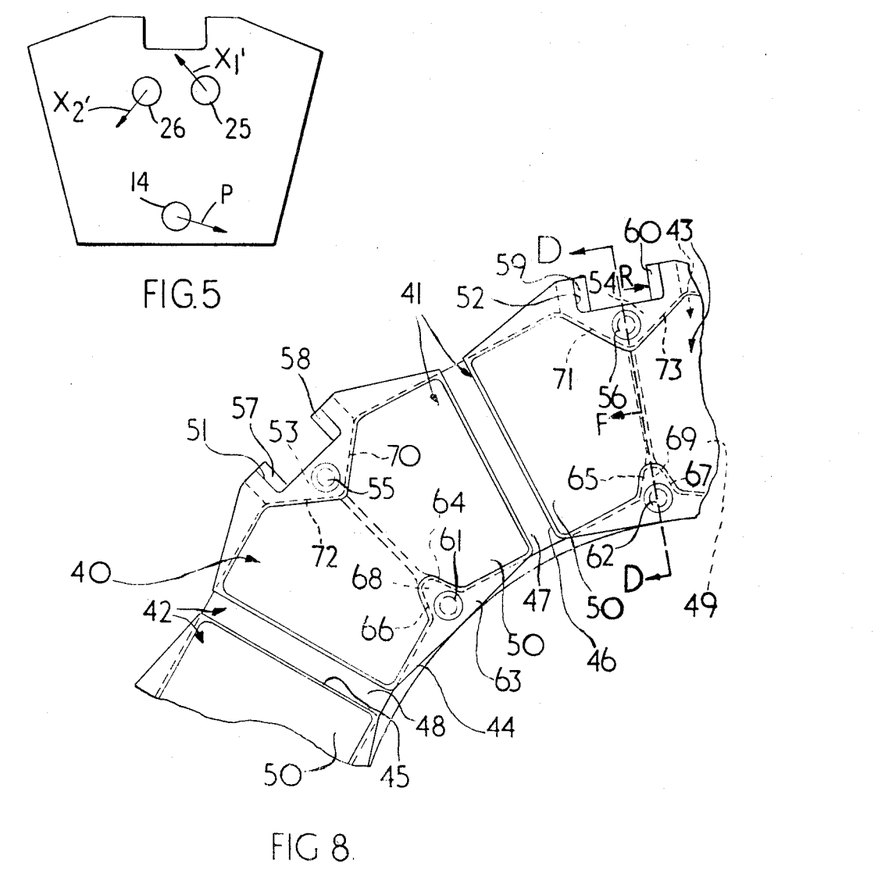
FIG. 5 is a diagrammatic representation of the forces acting on the outer layers 7 of element 4.
FIG. 8 is a side view of part of a further friction member in accordance with the present invention.

If we now consider the forces acting on the outer layers of element 4, shown diagrammatically in FIG. 5, we have resultant frictional force F, support reaction R, forces $X_1'$ and $X_2'$ exerted on the outer layers by rivets 26 and 25 and a further rivet force P of as yet unknown magnitude and direction exerted by rivet 14.

The magnitudes and directions of F and R are known. Considering the forces exerted on outer layers 7 by rivets 26 and 25 we can say that the force $X_2'$ exerted by rivet 26 on outer layers 7 is equal and opposite to the force $X_2$ exerted on inner layer 8, similarly as a result of the symmetry of the rotor the force $X_1'$ exerted by rivet 25 on outer layers 7 is equal and opposite to the force $X_1$ exerted on the inner layer 8. The inclination of $X_1'$ to the axis of symmetry (not shown) of inner layer 10 being equal to the inclination $\theta$ of the line of action of $X_1$ to axis of symmetry 31. Thus the lines of action of forces $X_1'$ and $X_2'$ can be determined and their magnitudes obtained for a given value of X.

By considering the equilibrium of the portion of the ring 16 in the vicinity of rivet 14 a further force diagram (not shown) can be obtained relating P and X. Hence by combining the information from this force diagram with that available from FIGS. 4 and 5 the force polygon for the outer layers 7 can be drawn for a given value of X. Construction of this force polygon shows that forces $X_1'$, $X_2'$ and P provide a total anticlockwise moment to balance the total clockwise moment of F and R.

The above account of the equilibrium of the outer layers of rotor element 4 is equally applicable to the outer layers of all the other rotor elements by virtue of the symmetry of the rotor construction.

FIGS. 6 and 7 show a friction member in accordance with the present invention for use as a stator in a multi-plate aircraft disc brake. In this construction the elements are arranged to engage support means in the form of axially extending keyways 29 at their inner peripheries. The friction elements are otherwise substantially identical in construction with the elements shown in FIGS. 1 and 2 and like or equivalent components and forces have therefore been indicated with the same numerals with a suffix *a* added.

Figure 9:
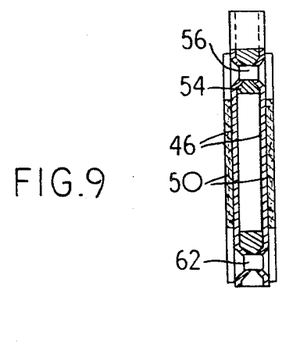
FIG. 9 is a cross-sectional view on the line D—D of FIG. 8.

FIGS. 8 and 9 show a further example of part of a friction member 40 in accordance with the present invention for use as a rotor in a multi-plate aircraft disc brake. The friction member is made up of a plurality of substantially sector-shaped elements generally designated for example 41,42,43 each element having a three-layer construction comprising two principal load-carrying outer layers 44,45,46 and a circumferentially displaced relatively low load-carrying inner layer 47,48 amd 49. In this construction as in FIGS. 1 and 6 the outer layers of each element overlap the inner layer of the circumferentially adjacent element and the outer principal load-carrying layers of each element are formed from a relatively strong structural material while the inner layer may be utilized principally as a heat sink and formed from a material with a higher thermal capacity.

Figure 10:
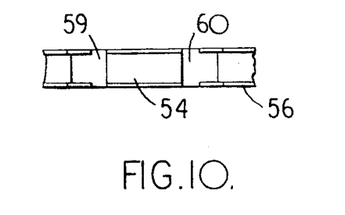
FIG. 10 is a view in the direction of arrow 'C' in FIG. 8 of insert 54.

Both the outer layers of each element may carry friction pads 50 on their axially outer sides, or alternatively only one outer layer, or in some cases neither outer layer, may carry a friction pad. The outer layers are provided with cut-outs 51,52 arranged to accept inserts 53,54. Inserts 53 and 54 are in turn arranged to engage support means in the form of keys (not shown) associated with a rotatable portion of the associated aircraft wheel. Rivets 55 and 56 secure inserts 53 and 54 in position, each insert being provided with two pairs of ears 57,58: 59,60 (see FIG. 10) which abut the sides of the associated cut out and transmit torque directly from the inserts to the outer layers of the elements.

The two outer layers of each element are rivetted 61,62 or otherwise secured to a retaining ring 63 at their inner peripheries. The radially inner corners of each inner layer of each element are chamfered to provide inclined abutment surfaces 64,65: 66,67 which are arranged to engage corresponding abutment surfaces on circumferentially spaced abutments 68,69 formed on retaining ring 63. The radially outer corners of each inner layer of each element are also chamfered to provide inclined abutment surfaces 70,71: 72:73 which are arranged to engage corresponding abutment surfaces on inserts 53,54. Thus each inner layer is located at each corner relative to the circumferentially adjacent outer layers without being directly secured thereto. The rivets used in the element construction shown in FIGS. 8 and 9 are countersunk into the inner layer so as to increase the cross-sectional area of material subjected to shear at the inner and outer layer interfaces. This rivet countersinking technique can also be used on any of the other composite element constructions disclosed in this application.

Figure 11:
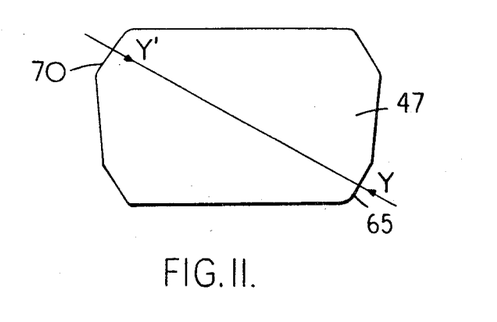
FIG. 11 is a diagrammatic representation of the forces acting on inner layer 47 of element 41.

The outer layers 46 of element 43, shown in FIG. 8, are subjected to the same resultant frictional force F and reaction R as the element 4 shown in FIG. 1. Thus outer layers 46 also tend to rotate in a clockwise direction when the rotor is subjected to braking forces while spinning in a clockwise direction. This tendency to rotate in a clockwise direction is transmitted to ring 63 via rivet 62 causing ring 63 to move slightly in an anti-clockwise direction to make abutting contact with surfaces 65,66, etc. on inner layers 47,48, etc. Thus the tendency of the outer layers 46 of element 43 to rotate is communicated to inner layer 47 as a force Y acting at right angles to abutment face 65 (see FIG. 11). The inner layer 47 therefore tends to rotate clockwise slightly thereby generating a reaction force from insert 53 acting on abutment face 70. By arranging diagonally opposite abutment faces 65 and 70 to be parallel to each other the magnitudes of Y and the reaction force Y' generated at abutment face 70 can be made of equal magnitude and also arranged to have the same line of action though acting in opposite senses (see FIG. 11). Hence the tendency of outer layer 46 to rotate in a clockwise direction is resisted by placing inner layer 47 in compression across surfaces 65 and 70.

Considering the forces acting on outer layers 46 (see FIG. 12) we have resultant frictional force F, support reaction R, a reaction force Y" equal and opposite to the force Y' exerted on inner layer 47 by insert 53, and a rivet force Z of as yet unknown magnitude and direction exerted by rivet 62. The parallel forces F and R can be reduced to a single force of magnitude F-R acting through the center 74 of the rotor (see FIG. 12) on a line of action 75 parallel to lines of action of F and R. The direction of the line of action 76 of reaction force Y" is known, being at right angles to surface 73, thus by extending this line to intersect line of action 75 the point 77 is determined through which rivet force Z must act for equilibrium of outer layers 46. Hence the line of action 78 of Z can be determined. The triangle of forces for outer layers 46 can therefore be drawn for a given value of Y and is of the form shown in FIG. 13. Reaction force Y" is equal in magnitude to communicated force Y and rivet force Z is a function of communicated force Y and the internal reaction forces in ring 63. Construction of this triangle of forces shows that forces Y" and Z provide an anti-clockwise moment to balance the total clockwise moment of F and R.

Figure 12:
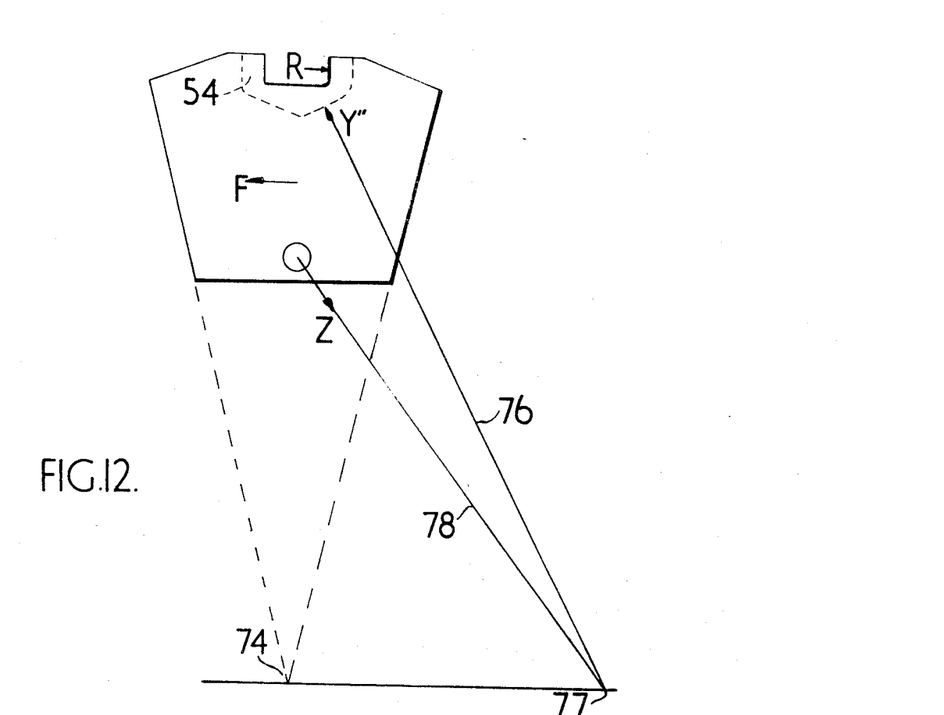
FIG. 12 is a diagrammatic representation of the forces acting on outer layer 46 of element 43.
Figure 13:
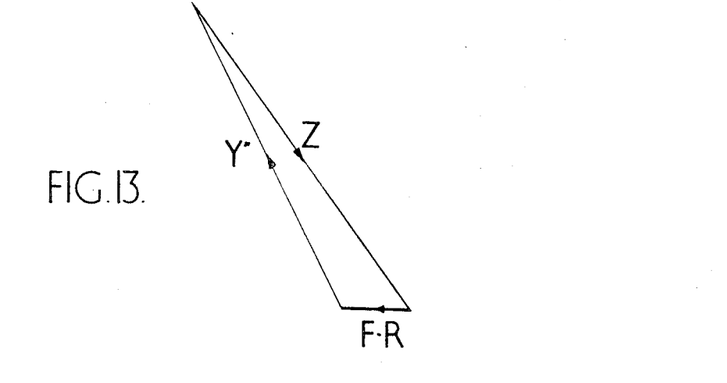
FIG. 13 is the triangle of forces (not to scale) for the force distribution shown in FIG. 12.

The above account of the equilibrium of the outer layers of element 43 is equally applicable to the outer layers of all the other rotor elements by virtue of the symmetry of the rotor construction.

Figure 14:
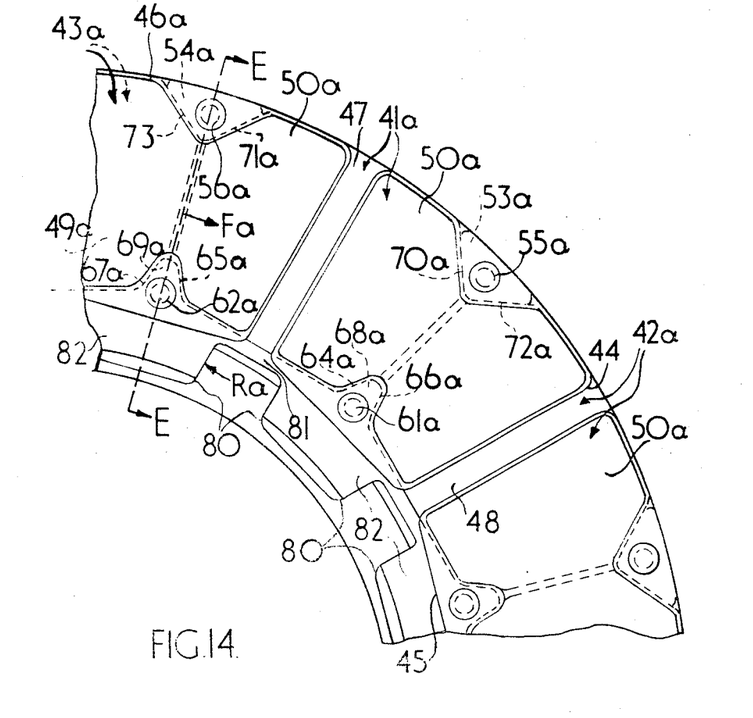
FIG. 14 is a side view of part of a still further friction member in accordance with the present invention.
Figure 15:
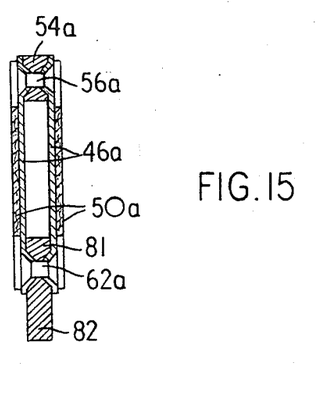
FIG. 15 is a cross-sectional view on the line E—E of FIG. 14.

FIGS. 14 and 15 show another form of friction member in accordance with the present invention for use as a stator in a multi-plate aircraft disc brake. In this construction the friction member elements are arranged to engage support means in the form of axially extending keyways 80 at their inner peripheries by rivetting the outer layers of each element to a ring 81 provided with radially inwardly projecting tongues 82 arranged to engage keyways 80. The friction elements of the friction member shown in FIGS. 14 and 15 are otherwise substantially identical to the construction of the elements shown in FIGS. 8 and 9 and like or equivalent components and forces have therefore been indicated with the same numerals with the suffix *a* added.

Figure 16:
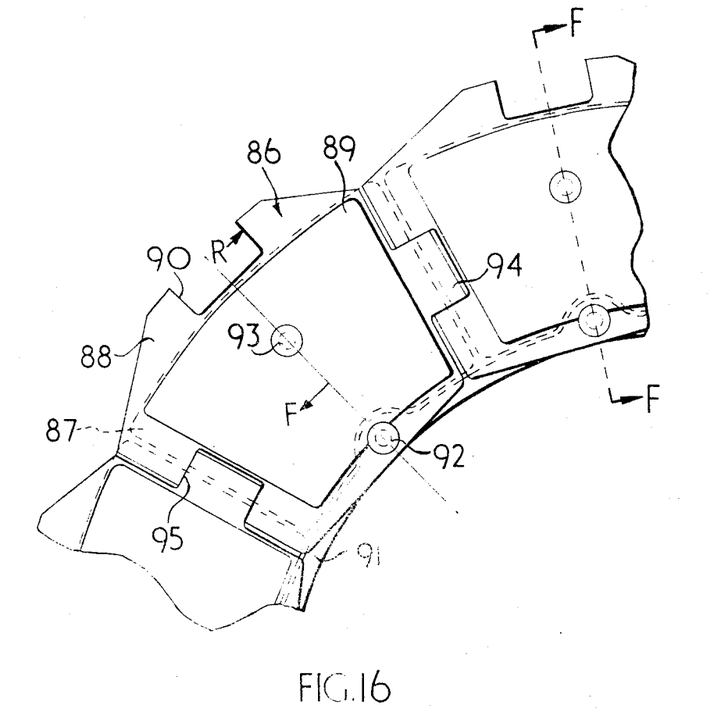
FIG. 16 is a side view of part of a still further friction member in accordance with the present invention.
Figure 17:
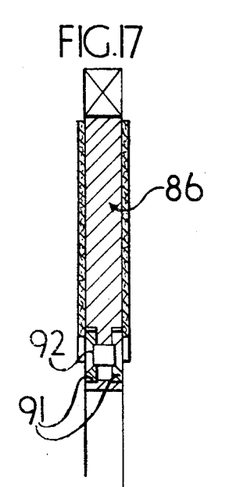
FIG. 17 is a cross-sectional view on the line F—F of FIG. 16 showing an element comprising a one-piece load-bearing portion (friction pad securing rivet omitted)
Figure 18:
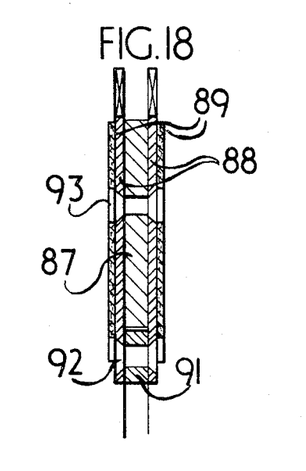
FIG. 18 is a cross-sectional view on the line F—F of FIG. 16 showing an element comprising a composite load-bearing portion.

FIGS. 16–18 show a further alternative form of the present invention, as applied to aircraft disc brake rotors, in which the circumferentially overlapping kind of element described above is not employed. In this construction each element comprises a substantially segmental-shaped load-bearing portion generally designated 86 which may be a one-piece construction (see FIGS. 17) of steel or other suitable material or alternatively may again be a three-layer construction (see FIG. 18) in which the inner layer 87 is a high thermal capacity structurally weaker material and the outer principal load-carrying layers 88 are formed from steel or other suitable material. Each load bearing portion carries a friction pad 89 on one, both or neither axially outer sides depending on the design of the brake for which the element is intended. The friction pad or pads may be secured to the load bearing portion by rivetting 93 or any other suitable means.

Each element is provided with a cut-out or cut-outs 90, depending on whether a one-piece load-bearing portion is adopted, to engage support means in the form of keys (not shown) in the manner previously described with reference to the FIGS. 1 and 8. Each element 6 is also secured at a position adjacent its inner periphery to a retaining ring or rings 91 by means of a rivet 90. FIG. 17 shows the manner in which two axially spaced rings set into circumferentially extending grooves in the side faces of a one-piece load-bearing portion can be utilized in place of a single ring.

The tendency of each element to rotate under braking torque, previously described above, is resisted by providing each element with a circumferentially extending tongue 94, or other suitable interconnecting means, on one radially extending face and a slot 95, or other corresponding suitable interconnecting means, on the other radially extending face to receive the corresponding circumferentially extending tongue, or other interconnecting means of the adjacent element.

As in the embodiments of the invention discussed above, the rotor elements shown in FIG. 16 tend to rotate in a clockwise manner under the action of the resultant frictional force F and support reaction R when the rotor is subjected to braking forces while rotating in a clockwise direction. Thus adjacent radially extending faces of adjacent elements are attempting to move in opposite directions; the faces of the elements provided with tongues in FIG. 16 attempting to move radially inwardly and the other faces of the elements provided with cut outs attempting to move radially outwardly. Thus the tongue of each element experiences an upward force from the cut-out of the adjacent element and the cut-out of each element experiences a downward force from the tongue of the adjacent element. By virtue of the symmetry of the rotor construction the above forces applied to each element by the circumferentially adjacent elements produce a total anti-clockwise moment which balances the total clockwise moment produced by F and R, thus each element is maintained in equilibrium. In the friction member construction shown in FIGS. 16–18 the ring or rings 91 takes or take no direct part in resisting the tendency of each element to rotate under braking torque, the ring or rings merely functioning to retain the elements in their correct radial and circumferential positions and to unite the elements to form a friction member which can be removed or replaced as a single unit.

Figure 19:
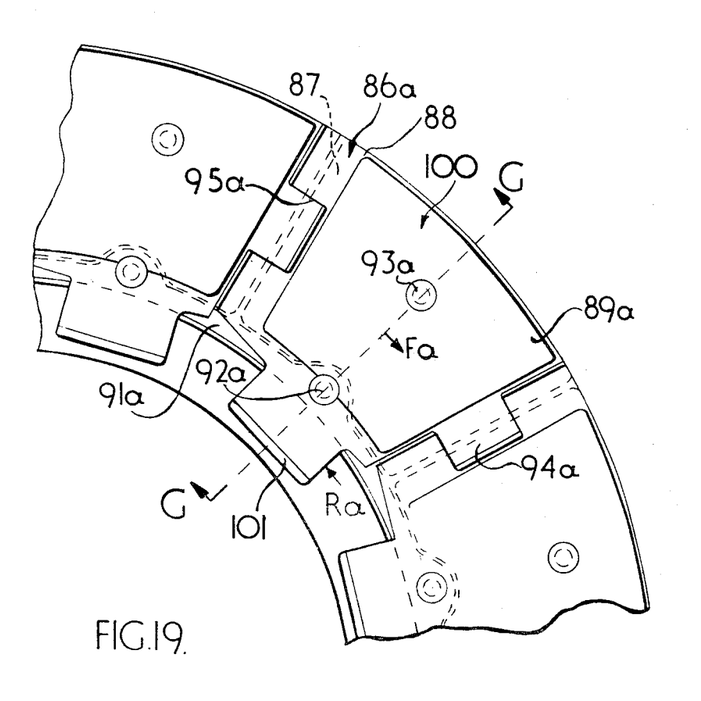
FIG. 19 is a side view of part of a still further friction member in accordance with the present invention.
Figure 20:
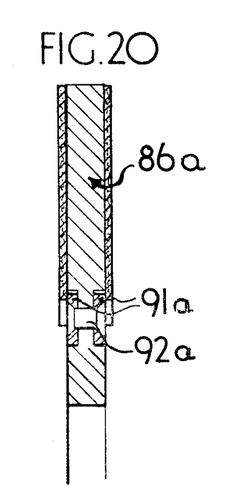
FIG. 20 is a cross-sectional view on the line G—G of FIG. 19 showing an element comprising a one-piece load-bearing portion (friction pad securing rivet omitted)
Figure 21:
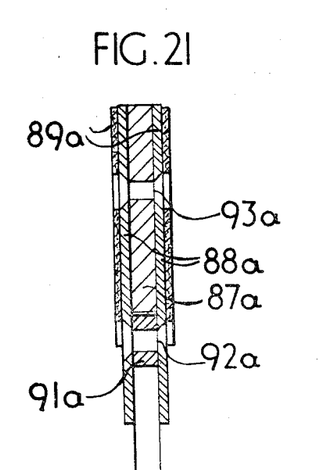
FIG. 21 is a cross-sectional view on the line G—G of FIG. 19 showing an element comprising a composite load-bearing portion.

FIGS. 19–21 show a still further form of the present invention, as applied to an aircraft disc brake stator, in which the elements 100 are arranged to engage support means in the form of axially extending keyways 101 at their inner peripheries.

The friction elements are otherwise substantially identical in construction with the elements shown in FIGS. 16–18 and like or equivalent components and forces have been indicated with the same numerals with a suffix *a*.

Although the embodiments of the invention described above the ring has been described as extending adjacent the inner peripheries of the friction member elements it will be understood by those skilled in the art that the ring (or rings) could equally be arranged to extend adjacent the outer peripheries of the elements by suitably modifying the element construction described above.

What I claim is:

1. An annular friction member for use in a disc brake or like friction mechanism, a plurality of interconnected substantially segmental-shaped friction elements, each element being arranged to be operatively associated with either a rotatable or nonrotatable portion of the disc brake or friction mechanism, each of the friction elements having a single attachment to said retaining ring to provide unrestricted thermal expansion and thermal shrinkage independently of said retaining ring which is proportioned to extend adjacent one of the peripheries of the elements, and each such frictional element comprising a pair of principal load-carrying outer layers and an inner layer sandwiched therebetween, the inner layer of each element being circumferentially displaced relative to the outer layers of the element so that the outer layers of each element also overlap the inner layer of the circumferentially adjacent element, the outer layers of each of the friction elements being secured to a retaining ring arranged to extend adjacent one of the peripheries of the elements, the retaining ring arranged to communicate the tendency of the two outer layers of each element to rotate in their own planes during braking, under the action of a moment set up by the resultant frictional force acting on the element and the reaction force applied to the element by the rotatable or nonrotatable portion of the disc brake or friction mechanism, to one of the two inner layers directly associated with the outer layers of each element, said inner layer being associated with the two overlapping pairs of outer layers so as to resist their respective tendencies to rotate under braking, each friction element being interconnected with the two circumferentially adjacent friction elements in such a manner as to resist any tendency of the element to rotate in its plane during braking under the action of a moment set up by the resultant frictional force acting on the element and the reaction force applied to the element by the rotatable or nonrotatable portion of the disc brake or friction mechanism, two associated ring abutments, an inner layer of each element held in position by abutting contact at its inner periphery with the two associated ring abutments and at its outer periphery by abutting contact with two inserts, one secured to each of the pairs of associated outer layers.

2. A friction member according to claim 1 wherein the corners of the inner layers of the elements are chamfered to engage corresponding abutment surfaces on the ring and inserts, the angle of chamfer of diagonally opposite corners of the inner layers being equal so that the diagonally opposite abutment faces so formed on the inner layers are parallel.

3. A friction member according to claim 1 wherein the respective pair of outer layers have inserts riveted thereto.

4. A friction member according to claim 1 wherein rotatable or nonrotatable portions of the disc brake or friction mechanisms have inserts arranged to engage therewith.

* * * * *